(No Model.)  3 Sheets—Sheet 1.
J. P. FULGHAM.
FERTILIZER DISTRIBUTER.
No. 353,551.  Patented Nov. 30, 1886.
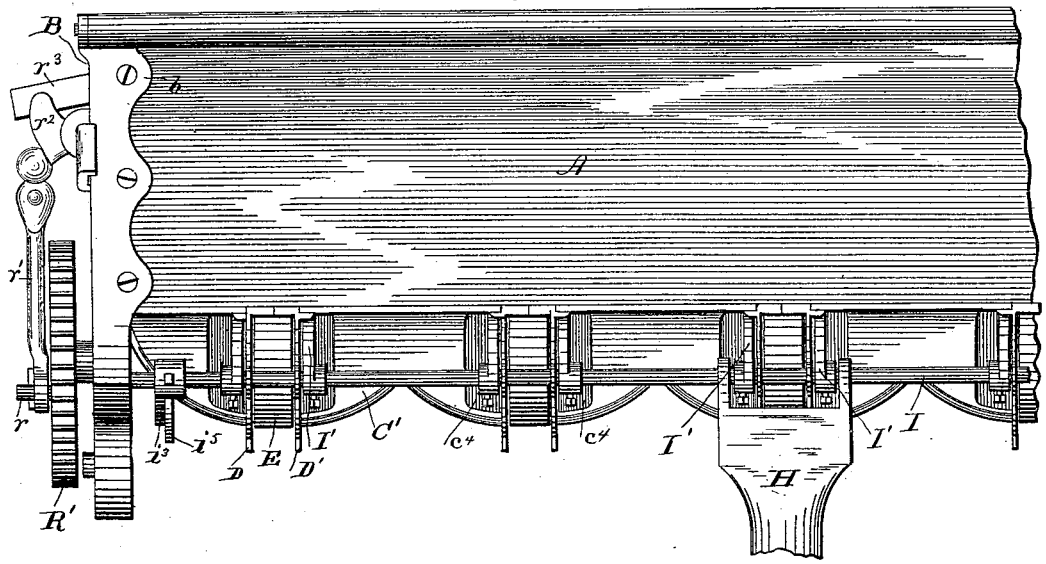
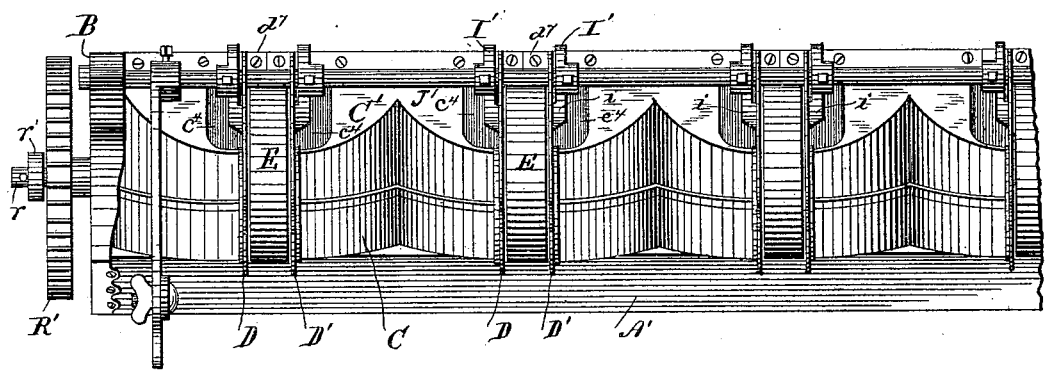
WITNESSES
Chas. R. Burr
A. J. Stewart
INVENTOR
Jesse P. Fulgham
By Church & Church
Attorneys (No Model.) 3 Sheets—Sheet 2.
J. P. FULGHAM.
FERTILIZER DISTRIBUTER.
No. 353,551. Patented Nov. 30, 1886.
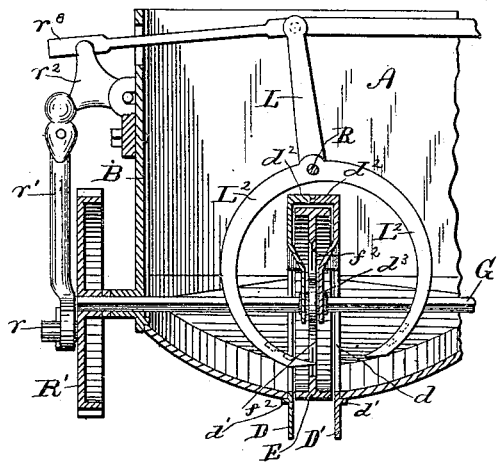
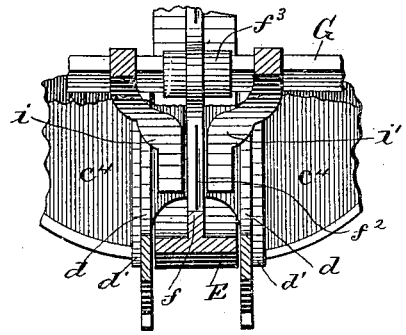
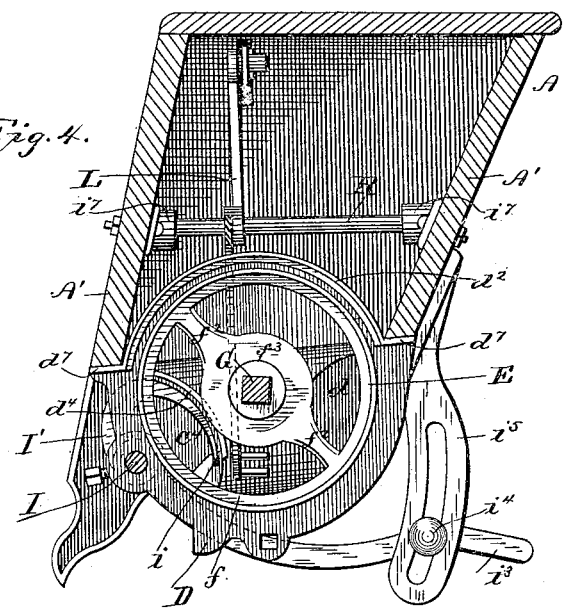

(No Model.) 3 Sheets—Sheet 3.
J. P. FULGHAM.
FERTILIZER DISTRIBUTER.
No. 353,551. Patented Nov. 30, 1886.
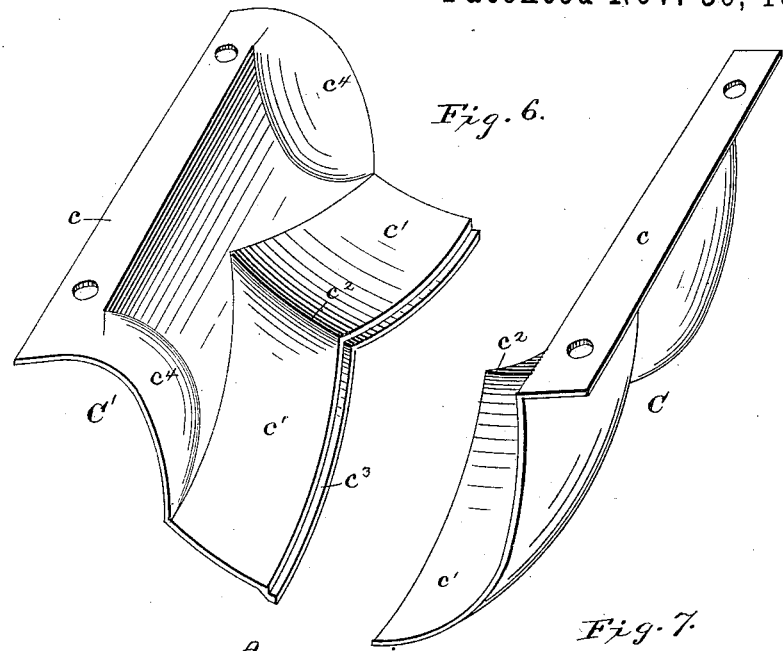
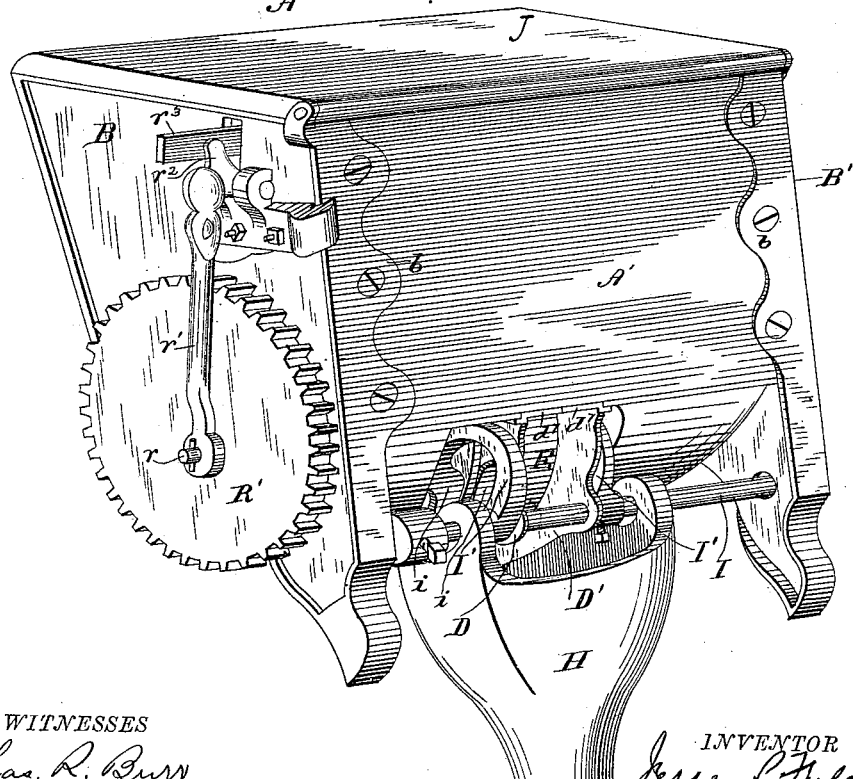
WITNESSES
Chas. R. Burr
A. J. Stewart
INVENTOR
Jesse P. Fulgham
By Church & Church
His Attorneys

UNITED STATES PATENT OFFICE.

JESSE P. FULGHAM, OF RICHMOND, INDIANA.

FERTILIZER-DISTRIBUTER.

SPECIFICATION forming part of Letters Patent No. 353,551, dated November 30, 1886.

Application filed March 26, 1886. Serial No. 196,699. (No model.)

*To all whom it may concern:*

Be it known that I, JESSE P. FULGHAM, of Richmond, in the county of Wayne and State of Indiana, have invented certain new and useful Improvements in Fertilizer-Distributers; and I do hereby declare the following to be a full, clear, and exact description of the same, reference being had to the accompanying drawings, forming a part of this specification, and to the figures and letters of reference marked thereon.

My present invention relates to that class of attachments known as "fertilizer-distributers" adapted more especially for use in connection with seed-drills, &c.; and it consists in the several novel elements and combinations hereinafter more fully described, and pointed out in the claims.

In the accompanying drawings, Figure 1 is a rear elevation, and Fig. 2 a bottom plan view, of an attachment for seed-drills with my present improvement applied thereto; Fig. 3, a longitudinal, and Fig. 4 a transverse, section through one of the sets of operating devices. Fig. 5 is a rear view of the lower portion of the hopper and feed-wheel, showing the location and arrangement of the cut-off. Fig. 6 is a view in perspective of the detachable bottom plates separated. Fig. 7 is a view in perspective of an attachment for corn-planters with my present invention applied thereto.

Similar letters of reference in the several figures indicate the same parts.

The letter A designates a hopper or receptacle for the material to be distributed, of any suitable dimension to adapt it to the machine to which it is to be attached. The front and rear walls, A', of this hopper, preferably constructed of wood, are attached to the end plates or heads, B B', by bolts or screws passing through the flanges $b$ $b$. To the lower edges of the front and rear walls, A', are detachably secured the bottom plates, C C', and between each set of plates C C' are in like manner secured the disk plates or castings D D', for the reception of the flanged feed-wheel E.

The bottom plates, C C', are constructed of substantially the form shown in Fig. 6, each section being provided with a flange, $c$, for attachment to the board J' of the hopper and with the reversely-inclined and curved faces $c'$ terminating in the central or dividing ridge, $c^2$. The rear section, C', is also formed with a flange or offset, $c^3$, to receive the edge of the front section, C, and form a tight joint, and with the inwardly-curved recesses $c^4$ at either end for the reception of the cut-off, hereinafter described. As thus constructed a pair of plates, C C', constitutes the half of two receptacles or divisions, within each of which is located a feeding mechanism.

With the exception of the end sections, or those next the heads B B', the several front sections, C, and rear sections, C', are respectively alike and interchangeable. The end sections differ from the intermediate sections in this respect only, that instead of being made double they represent but the half of a single receptacle or pocket, as seen in Fig. 2.

The disk-plates D D', situated between each pair of plates C C', form the casing for the reception of the feed-wheels E. Each of these plates is provided with an aperture, $d$, the lower edge corresponding to the curve of the bottom plates, C C', the latter resting on a semicircular flange or shoulder, $d'$, forming a tight joint at this point. The upper portion of each of these plates D D' is provided with a semicircular flange, $d^2$, the edges of the two flanges interlocking or lapping to form an inclosing-casing for the reception of the wheel E, which latter is provided with a boss or hub resting in openings or bearings $d^3$, formed in the disk-plates. The object in thus inclosing the feed-wheel is to prevent the material from packing between the outer periphery of the wheel and the sides of the hopper.

At or near the rear edge of the disk-plates is attached or formed a curved flange or plate, $d^4$, partaking of the same general form and direction as the edge of the plate C', where it is bent inward to form the recess $c^4$. These plates $d^4$ extend from the inner surface of the peripheral flange $f$ of the wheel E forward and downward, as shown in Fig. 4, and project from opposite sides toward the flat spokes or plates $f^2$, leaving a sufficient space for the passage of the latter. The disk-plates are attached to the boards A' of the hopper by screws passing through the flanges $d^7$.

The feed-wheels E are formed with the carrying-flanges $f$, united to the hub $f^3$ by a perforated or open web composed of the two thin diametrically-opposite spokes or plates $f^2$, and the hub is provided on one or both ends with a journal fitting into and supported by the bearings formed in the disk-plates. When thus constructed and arranged, the flanges $f$ of the feed-wheel occupy and close the space between the lower edges or flanges of the disk-plates, while the upper half of the wheel is inclosed and protected by the two disk-plates and their overlapping flanges; hence the material contained within the hopper will be sustained upon the sections C C' and the flanges of the feed-wheel, the material being deflected toward the disk-plates on either side by the inclined faces of the bottom sections, C C', and passing through the openings in the former is deposited upon the inner surface of the feed-wheel. By thus constructing the feed-wheels with a perforated or open web, or central disk, the material can be deposited upon the rim from either side, thereby maintaining an even and full feed.

The feed-wheels (one or more) are preferably sustained almost entirely by the disk-plates, although they may, if desired, be mounted directly upon the driving-shaft G, said shaft being made angular in cross-section, and fitting a corresponding opening in the hub of the feed-wheels, whereby the latter are caused to revolve with the shaft.

As the feed-wheels are revolved, they carry the material resting upon the inner surface of the flange under the lower edge of the plates $d^4$ outside of the hopper and into the space partially inclosed between the plates $d^4$ and the curved portions $c^4$ of the plates C'. The material thus carried beyond the walls of the hopper is scraped off from the feed-wheel and deflected into the boot H by coming in contact with the rear portion of the plates $d^4$. As thus constructed and arranged the plates $d^4$ serve not only to determine the opening, and hence the thickness of the stratum carried out by the feed-wheel, but also act as scrapers or deflectors for removing the material after it has been withdrawn from the hopper by the feed-wheel.

In rear and below the curved flanges $d^2$ is arranged a shaft or rod, I, supported at either end in the end pieces, B B', and passing through openings in the lower flanges of the disk-plates, as shown.

Located on opposite sides of the disk-plates and adjustably secured to the rod I is a pair of arms or plates, I', provided with curved extensions $i$, conforming to the rear face of the plates $d^4$ and projecting within the flanges of the feed-wheel. These extensions $i$, co-operating with the lower edge of the plates $d^4$, serve to limit the opening through which the material is carried and operate as an adjustable cut-off for regulating the feed.

The position of the cut-off is determined and adjusted by means of a hand-lever, $i^3$, attached to the rod I, and provided with a clamping-bolt, $i^4$, working in a segmental slot in the bracket $i^5$.

In order to prevent the material contained within the hopper from caking or bridging, and to maintain the proper delivery open to the inner surface of the feed-wheel, it is necessary to employ an agitator or stirrer which shall keep the material in motion and assist its movement toward the feed-wheel. With this end in view I have mounted above each feed-wheel a rock-shaft, R R, supported in suitable bearings, $i^7 i^7$, applied to the front and rear walls of the hopper, and upon said rock-shaft I have secured an arm, L, and two reversely-curved stirrers, $L^2$, preferably provided with lateral pins or projections, as seen in Fig. 4. As thus arranged, when the arm L is moved from side to side, the curved stirrers $L^2$ are alternately carried through the opening in the disk-plate and between the spokes or plates $f^2$ of the feed-wheel, thus insuring the movement and delivery of the material. The distance between the spokes or plates $f^2$ is sufficient to permit this movement of the stirrers through the feed-wheel without stopping the latter, and to prevent the possibility of the stirrers striking against the plates $f^2$, it is desirable that the former shall be oscillated at regular intervals and at a speed dependent upon the revolution of the shaft G carrying the feed-wheels. For the purpose of securing the proper motion of the stirrers and feed-wheels, so that they shall always preserve their relative positions and at all speeds, I have attached a crank or pin, $r$, to the driving-wheel R' on the shaft G, and connected it by a pitman, $r'$, to one end of the bell-crank lever $r^2$, the other end of said lever being connected by a link, $r^3$, to the arm L on rock-shaft R, the several parts being so arranged and combined that when the pitman is at either end of its stroke one of the stirrers will be projected into the feed-wheel and between the spokes thereof and will be withdrawn before the spoke arrives at the point where the stirrers enter.

Where a series of feed-wheels is employed the several arms L are connected by a rod, $m$, and thereby caused to move together. It will be observed that each feeding mechanism is complete in itself, and any one or more can be applied or removed without interfering with the operation of the remainder. Moreover, any number can be associated together, and by the simple removal of the intermediate sections the two end plates and a single feed mechanism can readily and expeditiously be fitted to shorter boards, A', as shown in Fig. 7, forming a compact and efficient fertilizer attachment for use upon corn-planters and like implements. It will be noticed also that both the scraper and adjustable gate or cut-off are located in the recess in rear and outside the hopper; hence are not covered by and do not interfere with the movements of the material within the hopper, and are at all times accessible for inspection, repair, or adjustment, without either the necessity of raising the lid J, removing the fertilizing substance, or in any manner disturbing or uncoupling the feed-wheels.

Having thus described my invention, I claim as new—

1. In a fertilizer-distributer of the character indicated, and in combination with the rotary flanged feed-wheel located and operating within the hopper, the plate forming with the wheel the outlet and scraper and an adjustable gate or cut-off located outside the hopper and acting in conjunction with the scraper-plates to determine the feed, substantially as described.

2. In a fertilizer-distributer, and in combination with its rotary flanged feeding-wheel, a casting for inclosing and protecting the wheel, provided with lateral openings for the passage of the material to the inner surface of the flange, substantially as described.

3. In combination with a rotary flanged feeding-wheel, the disk-plates provided with bearings for the wheel, a protecting and inclosing cap for the upper portion of the wheel, and lateral openings at or near the lower portion of the wheel, substantially as described.

4. In a fertilizer-distributer, and in combination with the rotary flanged feeding-wheel, an inclosing-casing provided with bearings for the hub of the wheel, lateral openings for the passage of the fertilizing material, and curved flanges or plates located within the rim of the wheel to serve as a cut-off and scraper, substantially as described.

5. The detachable disk-plates constructed substantially as described, in combination with the rotary flanged feed-wheel mounted in bearings in said plates, the whole constituting a complete feeding mechanism adapted to be applied to or removed from the hopper and driving-shaft, substantially as and for the purpose set forth.

6. In combination with the rotary feed-wheel and the scrapers, the adjustable gate or cut-off mounted upon a rod in rear of the hopper, said gate or cut-off being arranged to operate in conjunction with the feed-wheel and scraper outside the hopper, substantially as described.

7. In a fertilizer-distributer, and in combination with the feed-wheels thereof, the removable sectional bottom plates provided with the double-inclined walls, substantially as described.

8. The removable sectional bottom plates constructed, as described, with the reversely-inclined curved surfaces, the end recesses, the attaching flanges, and the overlapping edges, substantially as described.

9. In a fertilizer-distributer, and in combination with the hopper and rotary flanged feed-wheels, the described bottom sections and inclosing disk-plates, all constructed and arranged substantially as and for the purpose set forth.

10. In a fertilizer-distributer, and in combination with the hopper and rotating flanged feeding-wheel, the curved bottom sections and the disk-plates, the latter forming an inclosing-casing for the upper portion of the feed-wheel, and provided with the lower apertures and vertical flanges, between which latter the rim of the feed-wheel is received, substantially as described.

11. In combination with the disk-plates forming an inclosing-casing, perforated at the lower portion for the passage of the material and provided with the lower vertical flanges or plates and the scraper, a rotary feed-wheel composed of a circumferential flange or rim united to the hub by spokes or arms, whereby openings are formed in the feed-wheel for the passage from either side of the material contained in the hopper, substantially as described.

12. In a fertilizer-distributer, and in combination with a vertical feed-wheel provided with a horizontal carrying rim or flange and an open web, a reciprocating stirrer or agitator adapted and arranged to enter the wheel between the spokes or plates, substantially as described.

13. In a fertilizer-distributer, the combination of a rotary feed-wheel provided with a carrying-rim and a perforated central disk or web, and a reciprocating stirrer or agitator adapted to be inserted or withdrawn through the openings in the wheel while the latter is in motion, substantially as described.

14. In a fertilizer-distributer, and in combination with the perforated feed-wheel having a carrying rim or flange, a furcated lever mounted above the feed-wheel and provided with stirrers or agitators which are alternately projected into the openings in the feed-wheel from opposite sides, substantially as described.

15. In combination with the disk-plates forming the perforated inclosing-casing and the rotary feed-wheel contained therein, the reciprocating stirrers alternately projected through the openings in the casing, substantially as described.

16. In a fertilizer-distributer, and in combination with a series of feed-wheels, each provided with an internal carrying-rim and a perforated web, a series of stirrers or agitators each mounted upon separate pivots above the feed-wheels, and all connected together and osciliated in unison by the link, bell-crank lever, and pitman located at one end of the hopper, substantially as described.

17. In a fertilizer-distributer, and in combination with a series of feed-wheels independently supported and mounted, the longitudinal driving-shaft, the series of furcated stirrers or agitators mounted one above each feed-wheel, and all connected together and oscillating in unison with the rotation of the feed-wheels, as and for the purpose specified.

18. In a fertilizer-distributer, and in combination with the hopper and rotary feed-wheel provided with the internal carrying-rim, the inclined and curved bottom plates, and the furcated stirrers or agitators mounted on a shaft above the feed-wheel, substantially as described.

JESSE P. FULGHAM.

Witnesses:
A. S. STEUART,
MELVILLE CHURCH.